United States Patent
Rahal et al.

(10) Patent No.: US 10,442,984 B2
(45) Date of Patent: Oct. 15, 2019

(54) SMART FRACTURING FLUID

(71) Applicant: Halliburton Energy Services, Inc., Houston, TX (US)

(72) Inventors: Raed Rahal, Al-Khobar (SA); Michael Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 268 days.

(21) Appl. No.: 15/522,412

(22) PCT Filed: Dec. 3, 2014

(86) PCT No.: PCT/US2014/068322
§ 371 (c)(1),
(2) Date: Apr. 27, 2017

(87) PCT Pub. No.: WO2016/089387
PCT Pub. Date: Jun. 9, 2016

(65) Prior Publication Data
US 2017/0349813 A1     Dec. 7, 2017

(51) Int. Cl.
*C09K 8/62*     (2006.01)
*E21B 49/00*     (2006.01)
(Continued)

(52) U.S. Cl.
CPC ............. *C09K 8/62* (2013.01); *C09K 8/64* (2013.01); *C09K 8/665* (2013.01); *C09K 8/68* (2013.01);
(Continued)

(58) Field of Classification Search
CPC ...... E21B 49/00; E21B 47/102; E21B 47/122; E21B 47/0002; E21B 47/087;
(Continued)

(56) References Cited

U.S. PATENT DOCUMENTS

| | | |
|---|---|---|
| 4,446,433 A | 5/1984 | Schuck |
| 6,330,914 B1 | 12/2001 | Hocking et al. |

(Continued)

FOREIGN PATENT DOCUMENTS

| | | |
|---|---|---|
| WO | 2007/013883 A2 | 2/2007 |
| WO | 2007/019585 A2 | 2/2007 |

OTHER PUBLICATIONS

International Preliminary Report on Patentability issued in related Application No. PCT/US2014/068322, dated Jun. 15, 2017 (10 pages).

(Continued)

*Primary Examiner* — George S Gray
(74) *Attorney, Agent, or Firm* — Thomas Rooney; Baker Botts L.L.P.

(57) ABSTRACT

Methods and compositions for treating subterranean formations, and more specifically, to smart fracturing fluids. In one or more embodiments, the methods comprise providing a fracturing fluid that comprises a base fluid and an additive having a high dielectric constant; and introducing the fracturing fluid into least a portion of a subterranean formation. In one or more embodiments, the compositions comprise a base fluid and an additive having a high dielectric constant.

16 Claims, 2 Drawing Sheets

(51) Int. Cl.
  *E21B 47/12* (2012.01)
  *G01V 3/30* (2006.01)
  *E21B 43/267* (2006.01)
  *E21B 47/10* (2012.01)
  *C09K 8/64* (2006.01)
  *C09K 8/66* (2006.01)
  *C09K 8/68* (2006.01)
  *C09K 8/70* (2006.01)
  *C09K 8/80* (2006.01)
  *C09K 8/82* (2006.01)
  *C09K 8/84* (2006.01)
  *C09K 8/88* (2006.01)
  *C09K 8/92* (2006.01)

(52) U.S. Cl.
  CPC .............. *C09K 8/70* (2013.01); *C09K 8/805* (2013.01); *C09K 8/82* (2013.01); *C09K 8/845* (2013.01); *C09K 8/882* (2013.01); *C09K 8/92* (2013.01); *E21B 43/267* (2013.01); *E21B 47/102* (2013.01); *E21B 47/122* (2013.01); *E21B 49/00* (2013.01); *G01V 3/30* (2013.01); *C09K 2208/10* (2013.01)

(58) Field of Classification Search
  CPC ......... E21B 43/26; E21B 43/267; G01V 3/30; G01V 3/20; C09K 2208/10; C09K 8/80; C09K 8/805; C09K 8/62; C09K 8/82; C09K 8/882; C09K 8/92; C09K 8/845; C09K 8/64; C09K 8/70; C09K 8/68; C09K 8/665
  See application file for complete search history.

(56) References Cited

U.S. PATENT DOCUMENTS

| | | | |
|---|---|---|---|
| 6,725,930 | B2 | 4/2004 | Boney et al. |
| 7,073,581 | B2 | 7/2006 | Nguyen et al. |
| 7,082,993 | B2 | 8/2006 | Ayoub et al. |
| 7,424,911 | B2 | 9/2008 | McCarthy et al. |
| 7,451,812 | B2 | 11/2008 | Cooper et al. |
| 2005/0274510 | A1 | 12/2005 | Nguyen et al. |
| 2006/0102345 | A1* | 5/2006 | McCarthy ............. C09K 8/805 166/250.1 |
| 2008/0062036 | A1 | 3/2008 | Funk et al. |
| 2009/0288820 | A1 | 11/2009 | Barron et al. |
| 2010/0147512 | A1 | 6/2010 | Cramer et al. |
| 2011/0141846 | A1 | 6/2011 | Uhl et al. |
| 2011/0277994 | A1 | 11/2011 | Tambini et al. |
| 2011/0312859 | A1 | 12/2011 | Bicerano |
| 2012/0146648 | A1 | 6/2012 | Eick et al. |
| 2012/0152529 | A1 | 6/2012 | Eick et al. |
| 2012/0169343 | A1 | 7/2012 | Eick et al. |
| 2012/0245016 | A1 | 9/2012 | Curry et al. |
| 2014/0224480 | A1* | 8/2014 | Nguyen .................. C09K 8/80 166/247 |

OTHER PUBLICATIONS

International Search Report and Written Opinion issued in related PCT Application No. PCT/US2014/068322 dated Aug. 27, 2015, 12 pages.

\* cited by examiner

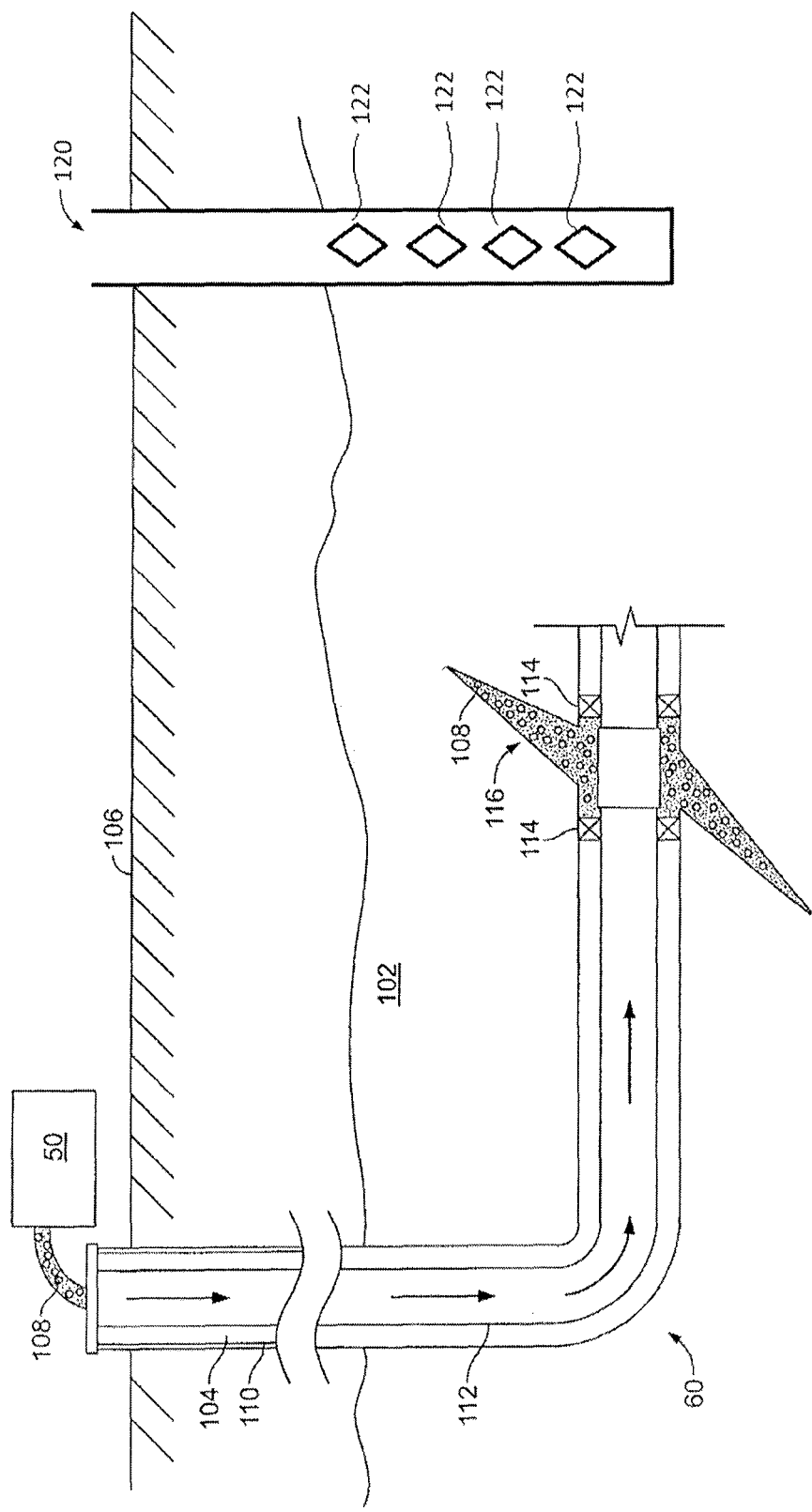

SMART FRACTURING FLUID

CROSS-REFERENCE TO RELATED APPLICATION

The present application is a U.S. National Stage Application of International Application No. PCT/US2014/068322 filed Dec. 3, 2014, which is incorporated herein by reference in its entirety for all purposes.

BACKGROUND

The present disclosure relates to methods and compositions for treating subterranean formations, and more specifically, to smart fracturing fluids.

Treatment fluids have been utilized in the treating of subterranean formations, e.g., for stimulation or sand control treatments such as fracturing or gravel packing, respectively. In fracturing treatments, a treatment fluid is pumped through a well bore into a subterranean formation at a rate and pressure such that one or more fractures are created or enhanced in a portion of the formation. The treatment fluid may comprise particulates, often referred to as "proppant particulates," that are deposited in the fractures. The proppant particulates function to prevent the fractures from fully closing upon the release of hydraulic pressure, forming conductive channels through which gases or fluids may flow to the well bore.

Geophones may be used to measure seismic waves formed by fractures when the fractures are formed. Measuring the seismic waves may allow for the structure of the fractures during fracture formation to be determined.

BRIEF DESCRIPTION OF THE DRAWINGS

These drawings illustrate certain aspects of some of the embodiments of the present disclosure, and should not be used to limit or define the claims.

FIG. 2 is a diagram illustrating an example of a subterranean formation in which a fracturing operation may be performed in accordance with certain embodiments of the present disclosure.

DETAILED DESCRIPTION

Figure 1:
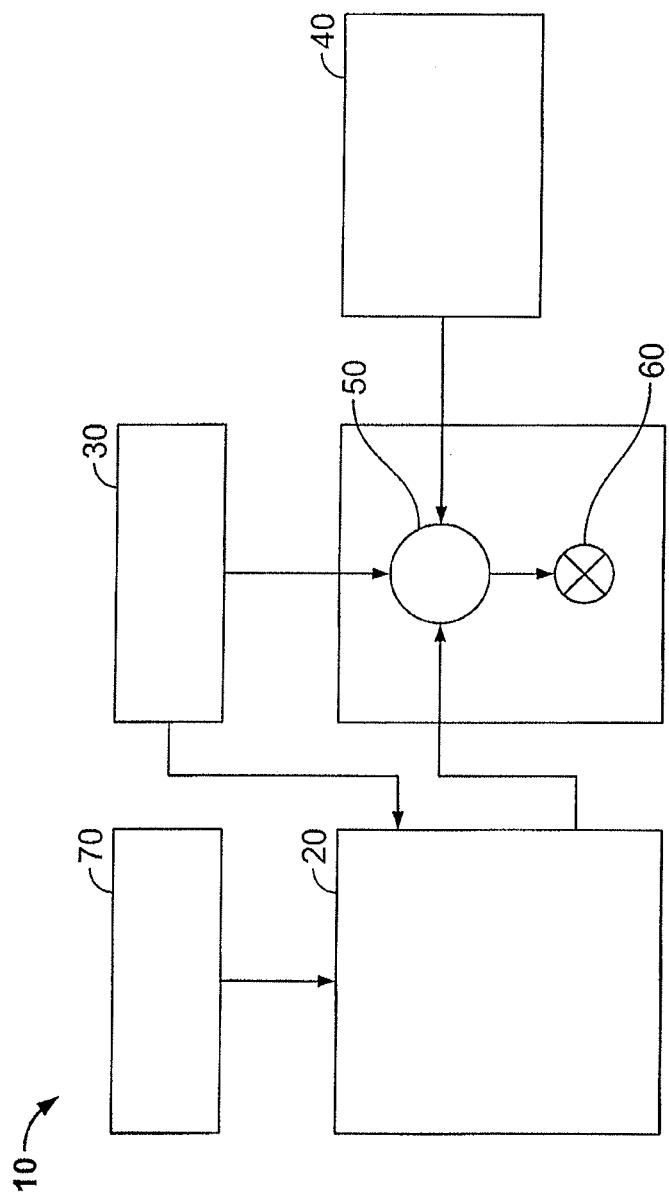
FIG. 1 is a diagram illustrating an example of a fracturing system that may be used in accordance with certain embodiments of the present disclosure.

The present disclosure relates to methods and compositions for treating subterranean formations, and more specifically, to smart fracturing fluids.

The present disclosure generally provides a fracturing fluid that comprises a base fluid, a plurality of proppant particulates, and an additive having a high dielectric constant. In some embodiments, the additive having a high dielectric constant may be a plurality of proppant particulates and the fracturing fluid may not contain proppant particulates separate from the additive having a high dielectric constant. The present disclosure also provides methods for using the fracturing fluid in a subterranean formation.

While the methods and fluids of the present disclosure have many advantages, only some will be discussed herein. One advantage of the present disclosure may include the use of smart fracturing fluids, that is fracturing fluids with a high dielectric constant. As used here, the term "high dielectric constant" refers to a dielectric constant greater than that of the base fluid or the subterranean formation. Utilizing fracturing fluids with a high dielectric constant may allow for properties of fractures formed in subterranean formations to be determined by measuring electromagnetic signals transmitted through fractures containing a fracturing fluid with a high dielectric constant. Another advantage of the present disclosure may include the use of smart fracturing fluids containing additives having a high dielectric constant. Adding additives having a high dielectric constant to a fracturing fluid may raise the fracturing fluid's dielectric constant. A fracturing fluid containing additives having a high dielectric constant may have a sufficiently high dielectric constant to be used in determining the properties of fractures in subterranean formations by measuring electromagnetic signals transmitted through the fractures containing the fracturing fluid. A fracturing fluid with a dielectric constant higher than that of the subterranean formation may allow for the properties of the fractures to be observed and/or determined by creating a contrast in dielectric constant between the fluid filled fractures and the subterranean formation.

The base fluids of the present disclosure may comprise aqueous-based fluids (e.g., water, brines, seawater, etc.), a polymer gel, foam, air, a hydrocarbon fluid, wet gases, and/or other fluids. The term "base fluid" refers to the major component of the fluid (as opposed to components dissolved and/or suspended therein), and does not indicate any particular condition or property of that fluids such as its mass, amount, pH, etc. The additives of the present disclosure may comprise particulates having a higher dielectric constant than the base fluid. The additives of the present disclosure may also act as proppant particulates for "propping" open fractures in a subterranean formation. For example, when water is used as a base fluid, an additive having a dielectric constant greater than 80 may be used because water has a dielectric constant of about 80. Adding an additive having a dielectric constant greater than the base fluid may result in a fracturing fluid having a dielectric constant higher than the base fluid.

In particular embodiments, the dielectric constant of the additives may be between 100 and 2000. The additives may include one or more of metal oxide, titanate, perovskite, carbide, conjugated polymer or fluoride particulates. Examples of additives may include titanium oxide, barium titanate, barium strontium titanate, strontium titanate, lead zirconium titanate, calcium copper titanate, and the like. Examples of conjugated polymers may include graphene, graphite, conductive polymers, and carbon nanotubes. The dielectric constant of the particulate additives may depend on a number of factors including temperature, pressure, synthetic method used to form the particulate, crystal type, particulate size, molecular weight and the like. The additives may have particulate diameters ranging from 2 nanometers to 1000 micrometers. The additive particulates may have various morphologies (i.e. structures). For example, the additive particulates may have hexagonal or cubic structures. In certain embodiments, the morphology of the particulate additive may affect its dielectric constant.

In certain embodiments, the fracturing fluid may contain a sufficient amount of additives to raise the fracturing fluid's dielectric constant above 150. The amount of additives needed to raise the dielectric constant of the fracturing fluid to a desired level may depend on both the base fluid and the additive used.

The fracturing fluids of the present disclosure may be introduced into at least a portion of a subterranean formation at or above a pressure sufficient to create or enhance one or more fractures in the subterranean formation. The fracturing fluids of the present disclosure may allow for the properties of the fractures to be determined by measuring electromagnetic signals transmitted through the subterranean formation.

The fracturing fluid may also include proppant particulates. The proppant particulates may "prop" open fractures created in a subterranean formation to allow fluids (e.g. oil, gas, and other hydrocarbons) to flow through the fractures. In certain embodiments, the proppant particulates may be the high dielectric constant additive described above. In certain embodiments, the proppant particulates may be coated with a material having a high dielectric constant. For example, the proppant particulates may be coated with a ceramic or high dielectric constant polymer (e.g. a conjugated polymer). In particular embodiments, the use of proppant particulates coated in a high dielectric constant material in addition to a high dielectric constant additive may further increase the dielectric constant of the fracturing fluid with respect to the base fluid.

The fracturing fluids of the present disclosure may be prepared using any suitable method and/or equipment (e.g., blenders, mixers, stirrers, etc.) known in the art at any time prior to their use. The fracturing fluids may be prepared at a well site or at an offsite location. In certain embodiments, the materials having a high dielectric constant and/or other components of the fracturing fluid may be metered directly into a base treatment fluid. In certain embodiments, the base fluid may be mixed with the materials having a high dielectric constant and/or other components of the fracturing fluid at a well site where the fracturing operation is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the fracturing fluids of the present disclosure may be prepared, either in whole or in part, at an offsite location and transported to the site where the fracturing operation is conducted.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with a base fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise aqueous-based fluids (e.g., water, brines, seawater, etc.), a polymer gel, foam, air, a hydrocarbon fluid, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, to increase the dielectric constant of the fluid, and/or to serve other functions. The proppant source 40 may include a proppant having a high dielectric constant or a proppant coated with a material having a high dielectric constant. For example, the proppant may be coated with a ceramic or high dielectric constant polymer.

The pump and blender system 50 receives the fracturing fluid and combines it with other components, including proppant from the proppant source 40 and/or additional additives (e.g. fluids or particulates) from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Additives 70 may include particulate additives having a high dielectric constant. In particular embodiments, the dielectric constant of the particulate additives may be between 100 and 2000. The particulate additives may include one or more of metal oxide, titanate, perovskite, carbide, conjugated polymers or fluoride particulates. Examples of particulate additives may include titanium oxide, barium titanate, barium strontium titanate, strontium titanate, lead zirconium titanate, calcium copper titanate, and the like. Examples of conjugated polymers may include graphene, graphite, conductive polymers, and carbon nanotubes. The dielectric constant of the particulate additives may depend on a number of factors including temperature, pressure, synthetic method used to form the particulate, crystal type, particulate size, molecular weight and the like. In some embodiments, the high dielectric constant additives may serve as proppants.

The particulate additives may have particulate diameters ranging from 2 nanometers to 1000 micrometers. The particulate additives may have various morphologies (i.e. structures). For example, the particulate additives may have hexagonal or cubic structures. In certain embodiments, the morphology of the particulate additive may affect its dielectric constant.

The particulate additives having a high dielectric constant may be added to the fracturing fluid to raise the fluid's dielectric constant. In particular embodiments, at least five grams of particulate additives having a high dielectric constant may be added for each gallon of fracturing fluid. In other embodiments, the particulate additives having a high dielectric constant may be added in sufficient quantity to raise the dielectric constant of the fracture fluid to at least 150.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 descending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. In some embodiments, well bore 104 may include plugs, sleeves, and other devices or techniques that may be used with multi-zone fracturing techniques (not illustrated). When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. A plurality of the proppant particulates in the fracturing fluid 108 may enter the fractures 116 where they may remain after the fracturing fluid flows out of the well bore. These proppant particulates may "prop" fractures 116 such that fluids may flow more freely through the fractures 116.

FIG. 2 also shows an observatory well 120 containing transceivers 122. Observatory well 120 may contain as few as one or as many as one hundred transceivers 122. In particular embodiments, transceivers 122 may be a fiber or cable the length of all or a portion of observatory well 120. In some embodiments, multiple observatory wells 120 may be placed around subterranean formation 102. Observatory wells 120 may be placed with 1000 meters of fractures 116. In certain embodiments, observatory wells 120 may be placed between 200 to 300 meters of each other. Although shown as vertical, observatory well 120 may include horizontal, vertical, slant, curved, and other types of well bore geometries and orientations.

Transceivers 122 may be used to transmit and receive electromagnetic signals for use in measuring subterranean formation 102. Transceivers 122 may be used to transmit and receive electromagnetic signals for use in determining the properties of fractures 116. Measuring electromagnetic signals transmitted by transceivers 122 may allow for determination of the properties of fractures 116. In certain embodiments, transceivers 122 located in a signal observatory well 120 may both transmit and receive electromagnetic signals. in other embodiments, transceivers 122 in a first observatory well may transmit electromagnetic signals and transceivers 122 in a second observatory well may receive the transmitted electromagnetic signals.

Transceivers 122 may transmit and receive electromagnetic signals having frequencies ranging from 1 MHz to 10 GHz. The frequencies of the electromagnetic signals transmitted by transceivers 122 may affect how far the signals can be used to measure into subterranean formation 102. Electromagnetic signals having a lower frequency may allow for the signals to be measured farther into subterranean formation 102 than electromagnetic signals having a higher frequency. For example, electromagnetic signals transmitted with a frequency of 10 MHz may allow for measurement of up to 200 meters into subterranean formation 102, while electromagnetic signals having a frequency of 10 GHz may allow for measurement of only a few feet.

The properties of fractures 116 may be determined by measuring how electromagnetic signals transmitted by transceivers 122 are affected by fluid 108. Electromagnetic signals passing through fluid 108 may be affected differently by fluid 108 having a high dielectric constant than by fluids not having a high dielectric constant or by subterranean formation 102. In some embodiments, transceivers 122 may measure how the electromagnetic signals transmitted by transceivers 122 are affected by fluid 10 when fluid 108 has a high enough dielectric constant. In particular embodiments, transceivers 122 may measure how the electromagnetic signals transmitted by transceivers 122 are affected by fluid 108 when fluid 108 has a dielectric constant greater than or equal to 150.

As described with respect to FIG. 1, additives containing particulate additives having a high dielectric constant may be added to fluid 108 to provide fluid 108 with a high dielectric constant. In particular embodiments, transceivers 122 may measure how the electromagnetic signals transmitted by transceivers 122 are affected by fluid 108 containing particulate additives having a high dielectric constant. In other embodiments, transceivers 122 may measure how electromagnetic signals are affected by fluid 108 containing particulate additives having a high dielectric constant and proppant coated with a high dielectric constant material.

Measured electromagnetic signals transmitted through fluid 108 and subterranean formation 102 may be used to determine properties of fractures 116. Properties of fractures 116 that may be determined by measuring electromagnetic signals transmitted through fluid 108 and subterranean formation 102 include the size, orientation, structure and porosity of fractures 116. Utilizing a fluid 108 having a high dielectric constant may facilitate determining the properties fractures 116 from electromagnetic signals measured by transceivers 122. In certain embodiments, a measuring electromagnetic signals transmitted through a fluid with a higher dielectric constant may allow for greater resolution or accuracy when determining the properties of fractures 116 when compared to a fluid with a lower dielectric constant. Fluid 108 having a high dielectric constant may facilitate determining the properties fractures 116 by increasing the contrast in conductivity between fractures 116 containing fluid 108 having a high dielectric constant and the remainder of the portion of subterranean formation 102 that does not contain fluid 108. This contrast in conductivities may be measured in the electromagnetic signals transmitted from transceivers 122.

In certain embodiments, measuring electromagnetic signals passing through a fluid 108 containing particulates having a high dielectric constant and a proppant coated with a high dielectric constant material may provide increased resolution when compared to measuring signals passing through fluid 108 containing only particulate additives having a high dielectric constant.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment comprises, a method comprising: providing a fracturing fluid that comprises a base fluid and an additive having a high dielectric constant; and introducing the fracturing fluid into least a portion of a subterranean formation.

An embodiment comprises: a fracturing fluid comprising a base fluid and an additive having a high dielectric constant.

An embodiment comprises: a method of preparing a fracturing fluid comprising: providing a base fluid, providing an additive having a high dielectric constant, and combining the base fluid, and the additive to form a fracturing fluid. The additive substantially increases the dielectric constant of the fracturing fluid relative to a fracturing fluid without the additive.

An embodiment comprises: a method comprising: providing fracturing fluid that comprises a base fluid, and an additive having a high dielectric constant. The additive substantially increases the dielectric constant of the fracturing fluid relative to a fracturing fluid without the additive. The method also comprises: introducing the fracturing fluid to at least a portion of a subterranean formation at a pressure sufficient to create or enhance one or more fractures in at least a portion of the subterranean formation, transmitting an electromagnetic signal from one or more transceivers into at least a portion of the subterranean formation, receiving a signal at the one or more transceivers, and determining properties of the one or more fractures within at least a portion of the subterranean formation based on the received signals.

An embodiment comprises: a fracturing fluid comprising: a base fluid, and an additive having a high dielectric constant. The additive substantially increases the dielectric constant of the fracturing fluid relative to a fracturing fluid without the additive.

An embodiment comprises: a system comprising: a pump configured to introduce a fracturing fluid into at least a portion of a subterranean formation through a wellbore at a pressure sufficient to create or enhance one or more fractures in at least a portion of the subterranean formation. The fracturing fluid comprises a base fluid, and an additive having a high dielectric constant. The system also comprises at least one transceiver configured to: transmit an electromagnetic signal into at least a portion of the subterranean formation, receive the transmitted electromagnetic signal, and determine properties of the one or more fractures in at least a portion of the subterranean formation based on the received electromagnetic signal.

An embodiment comprises, a method comprising: providing a fracturing fluid that comprises a base fluid, a plurality of proppant particulates, and an additive having a high dielectric constant; and introducing the fracturing fluid into least a portion of a subterranean formation.

An embodiment comprises: a fracturing fluid comprising a base fluid, a plurality of proppant particulates, and an additive having a high dielectric constant.

An embodiment comprises: a method of preparing a fracturing fluid comprising: providing a base fluid, providing a plurality of proppant particulates, providing an additive having a high dielectric constant, and combining the base fluid, the plurality of proppant particulates, and the additive to form a fracturing fluid. The additive substantially increases the dielectric constant of the fracturing fluid relative to a fracturing fluid without the additive.

An embodiment comprises: a method comprising: providing fracturing fluid that comprises a base fluid, a plurality of proppant particulates, and an additive having a high dielectric constant. The additive substantially increases the dielectric constant of the fracturing fluid relative to a fracturing fluid without the additive. The method also comprises: introducing the fracturing fluid to at least a portion of a subterranean formation at a pressure sufficient to create or enhance one or more fractures in at least a portion of the subterranean formation, transmitting an electromagnetic signal from one or more transceivers into at least a portion of the subterranean formation, receiving a signal at the one or more transceivers, and determining properties of the one or more fractures within at least a portion of the subterranean formation based on the received signals.

An embodiment comprises: a fracturing fluid comprising: a base fluid, a plurality of proppant particulates, and an additive having a high dielectric constant. The additive substantially increases the dielectric constant of the fracturing fluid relative to a fracturing fluid without the additive.

An embodiment comprises: a system comprising: a pump configured to introduce a fracturing fluid into at least a portion of a subterranean formation through a wellbore at a pressure sufficient to create or enhance one or more fractures in at least a portion of the subterranean formation. The fracturing fluid comprises a base fluid, a plurality of proppant particulates, and an additive having a high dielectric constant. The system also comprises at least one transceiver configured to: transmit an electromagnetic signal into at least a portion of the subterranean formation, receive the transmitted electromagnetic signal, and determine properties of the one or more fractures in at least a portion of the subterranean formation based on the received electromagnetic signal.

To facilitate a better understanding of the present disclosure, the following representative examples of certain aspects of some embodiments are given. In no way should the following examples be read to limit, or define, the scope of the claims or disclosure.

EXAMPLES

The following examples are submitted for the purpose of demonstrating the high dielectric constant of particulate additives. The below high dielectric constant materials may be added as particulates to fracture fluids to increase the dielectric constant of the fracturing fluid.

TABLE 1

Dielectric Constants of Particulate Additives

| Particulate Additive | Dielectric Constant |
| --- | --- |
| Titanium oxide | 173 |
| Barium titanate | 1250-10000 |
| Barium strontium titanate | 500-10000 |
| Strontium titanate | 310-10000 |
| Lead ziconium titanate | 500-10000 |
| Conjugated Polymers | 6-100000 |
| Calcium copper titanate | >12000 |

The dielectric constant of the above listed titanates may depend on a number of factors including temperature, pressure, synthetic method used to form the particulate, crystal type, particulate size and the like. The dielectric constant of conjugate polymers may depend on a number of factors include temperature, pressure, molecular weight, and the like.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a fracturing fluid that comprises:
   a base fluid, and
   an additive having a high dielectric constant from about 100 to about 2000, wherein the fracturing fluid has a dielectric constant, wherein the fracturing fluid dielectric constant is raised by the additive to within the range of the additive's dielectric constant, but no less than 150, and further wherein the additive increases the dielectric constant of the fracturing fluid relative to a fracturing fluid without the additive; and
   introducing the fracturing fluid into a wellbore located in at least a portion of a subterranean formation;
   transmitting an electromagnetic signal from one or more transceivers into at least a portion of the subterranean formation, wherein the transceivers are located in an observatory well proximate to the wellbore; and
   receiving a signal at the one or more transceivers.

2. The method of claim 1, wherein the additive comprises at least one material selected from the group consisting of: a metal oxide, a titanate, a perovskite, a carbide, a fluoride, a conjugated polymer, and any combination thereof.

3. The method of claim 1, wherein the additive comprises at least one material selected from the group consisting of: titanium oxide, barium titanate, barium strontium titanate, and any combination thereof.

4. The method of claim 1, wherein the fracturing fluid is introduced into at least a portion of a subterranean formation using one or more pumps.

5. The method of claim 1, wherein a diameter of the additive is between 2 nanometers and 1000 micrometers.

6. The method of claim 1, wherein the fracturing fluid further comprises a plurality of proppant particulates, the plurality of proppant particulates comprising a plurality of coated proppant particulates coated with a coating having a high dielectric constant.

7. The method of claim 1 further comprising;
   determining properties of one or more fractures within at least a portion of the subterranean formation based on the received signals.

8. The method of claim 1, further comprising mixing the base fluid and the additive using mixing equipment.

9. A fracturing fluid comprising:
   a base fluid; and
   an additive having a high dielectric constant from about 100 to about 2000, wherein the fracturing fluid has a dielectric constant, wherein the fracturing fluid dielectric constant is raised by the additive to within the range of the additive's dielectric constant, but no less than 150, and further wherein the additive increases the dielectric constant of the fracturing fluid relative to a fracturing fluid without the additive.

10. The fracturing fluid of claim 9, wherein the additive comprises at least one material selected from the group consisting of: a metal oxide, a titanate, a perovskite, a carbide, a fluoride, a conjugated polymer, and any combination thereof.

11. The fracturing fluid of claim 9, wherein the additive comprises at least one material selected from the group consisting of: titanium oxide, barium titanate, barium strontium titanate, and any combination thereof.

12. The fracturing fluid of claim 9, wherein a diameter of the additive is between 2 nanometers and 1000 micrometers.

13. A method comprising:
   providing fracturing fluid that comprises:
   a base fluid, and
   an additive having a high dielectric constant from about 100 to about 2000, wherein the fracturing fluid has a dielectric constant, wherein the fracturing fluid dielectric constant is raised by the additive to within the range of the additive's dielectric constant, but no less than 150, and further wherein the additive substantially increases the dielectric constant of the fracturing fluid relative to a fracturing fluid without the additive;

introducing the fracturing fluid to a wellbore located in a portion of a subterranean formation at a pressure sufficient to create or enhance one or more fractures in at least the portion of the subterranean formation;

transmitting an electromagnetic signal from one or more transceivers into at least the portion of the subterranean formation, wherein the transceivers are located in an observatory well proximate to the wellbore;

receiving a signal at the one or more transceivers; and determining properties of the one or more fractures within at least the portion of the subterranean formation based on the received signals.

14. The method of claim 13, wherein the additive comprises at least one material selected from the group consisting of: a metal oxide, a titanate, a perovskite, a carbide, a fluoride, a conjugated polymer, and any combination thereof.

15. The method of claim 13, wherein the additive comprises at least one material selected from the group consisting of: titanium oxide, barium titanate, or barium strontium titanate, and any combination thereof.

16. The method of claim 13, wherein a diameter of the additive is between 2 nanometers and 1000 micrometers.

* * * * *